United States Patent
Klaedtke et al.

(10) Patent No.: US 10,261,207 B2
(45) Date of Patent: Apr. 16, 2019

(54) SEISMIC NOISE MITIGATION SYSTEM AND METHOD

(71) Applicant: PGS Geophysical AS, Olso (NO)

(72) Inventors: Andreas Klaedtke, Weybridge (GB); Paolo Terenghi, Weybridge (GB); Roald Gunnar van Borselen, Voorschoten (NL); Richard Michael Dyer, Weybridge (GB)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 15/536,554

(22) PCT Filed: Dec. 18, 2015

(86) PCT No.: PCT/IB2015/002505
§ 371 (c)(1),
(2) Date: Jun. 15, 2017

(87) PCT Pub. No.: WO2016/097866
PCT Pub. Date: Jun. 23, 2016

(65) Prior Publication Data
US 2018/0017693 A1   Jan. 18, 2018

Related U.S. Application Data

(60) Provisional application No. 62/093,759, filed on Dec. 18, 2014.

(51) Int. Cl.
*G01V 1/36* (2006.01)
*G01V 1/38* (2006.01)

(52) U.S. Cl.
CPC ............ *G01V 1/364* (2013.01); *G01V 1/36* (2013.01); *G01V 1/38* (2013.01); *G01V 2210/32* (2013.01);

(Continued)

(58) Field of Classification Search
CPC . G01V 1/364; G01V 1/36; G01V 1/38; G01V 2210/32; G01V 2210/324; G01V 2210/44
See application file for complete search history.

(56) References Cited

U.S. PATENT DOCUMENTS 5,067,112 A * 11/1991 Meek ................. G01V 1/364
                                                       367/43
5,309,406 A *  5/1994 Ongkiehong ....... G01V 1/362
                                                       367/38

(Continued)

OTHER PUBLICATIONS

Truong Nguyen et al: "Seismic interpolation by optimally matched Fourier components", SEG Technical Program Expanded Abstracts, Dec. 31, 2011.

(Continued)

*Primary Examiner* — Ian J Lobo

(57) ABSTRACT

A seismic noise mitigation method. The method comprises identifying a wavenumber of a component in a residual wavenumber spectrum having a largest norm based on a preconditioned residual wavenumber spectrum. A contribution to the residual wavenumber spectrum from the identified wavenumber component, is subtracted therefrom. A next residual wavenumber spectrum is based thereon and a relative residual computed based on that. The identifying, subtracting and calculating are repeated until a first to occur termination condition selected from the group consisting of: a current relative residual is less than a threshold residual; a difference between the current relative residual and a smallest relative residual exceeds product of the smallest relative residual and a preselected threshold factor; and a difference between a current number of iterations and a number of iterations corresponding to a currently encountered smallest relative residual encountered exceeds a preselected threshold number of iterations.

25 Claims, 7 Drawing Sheets

(52) U.S. Cl.
CPC .... *G01V 2210/324* (2013.01); *G01V 2210/44* (2013.01)

(56) References Cited

U.S. PATENT DOCUMENTS

| | | |
|---|---|---|
| 7,751,277 B2 | 7/2010 | Schonewille |
| 9,541,659 B2* | 1/2017 | Vassallo ................ G01V 1/362 |
| 2009/0231956 A1 | 9/2009 | Schonewille |
| 2010/0211321 A1* | 8/2010 | Ozdemir ................ G01V 1/364 |
| | | 702/14 |
| 2011/0060528 A1 | 3/2011 | Ozbek et al. |
| 2013/0121109 A1 | 5/2013 | Baardman et al. |
| 2014/0269183 A1 | 9/2014 | Kluver et al. |
| 2014/0365135 A1 | 12/2014 | Poole |

OTHER PUBLICATIONS

International Search Report for PCT Application No. PCT/IB2015/002505, dated May 7, 2016.

Schonewille, Michel et al: "Seismic Data Regularization with the Anti-Alias Anti-Leakage Fourier transform", First Break, Sep. 2009, vol. 27.

Xu, Sheng et al.: "Antileakage Fourier transform for seismic data regularization", Geophysics, Jul.-Aug. 2005, vol. 70, No. 4.

* cited by examiner

SEISMIC NOISE MITIGATION SYSTEM AND METHOD

CROSS-REFERENCE TO RELATED APPLICATIONS

This application claims the benefit of U.S. Provisional Application Ser. No. 62/093,759, filed Dec. 18, 2014 and titled "Reducing Seismic Interference". The provisional application is incorporated by reference herein as if reproduced in full below.

BACKGROUND

Marine survey systems are used to acquire data regarding geologic formations below a body of water such as a lake or ocean. The marine survey systems may use a plurality of sensor streamers towed through the body of water, where each sensor streamer receives energy (e.g., acoustic energy) reflected from the geologic formations. Energy received by each sensor streamer may contain not only the signals of interest but seismic interference noise that may arise from one or more sources such as seismic acoustic sources deployed by nearby vessels, seismic energy scattered from objects in the water such as platforms, and the like. Seismic interference noise may interfere with the interpretation of the data.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying electrical power and/or signals between components.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

Various embodiments are directed to mitigating the effects of seismic interference in marine seismic survey data. The specification first turns to an illustrative marine survey system to orient the reader, and then to example embodiments.

Figure 1:
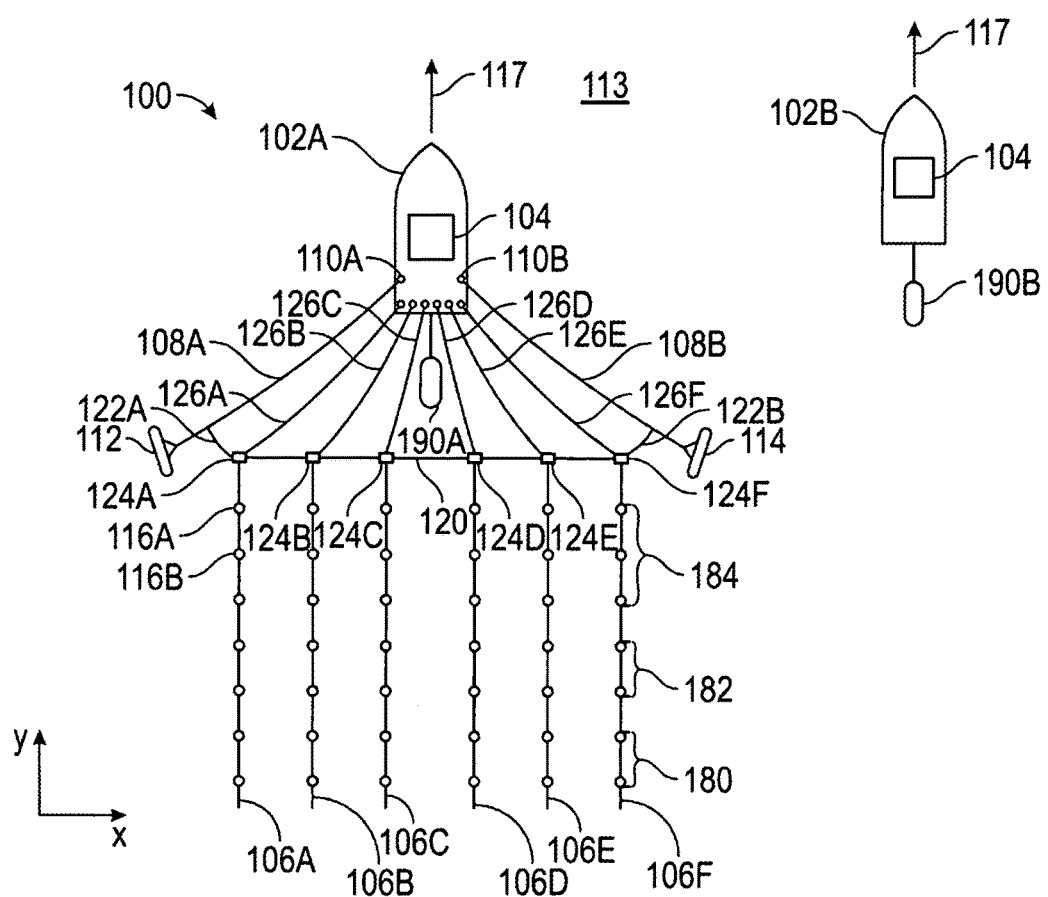
FIG. 1 shows an overhead view of a marine survey system in accordance with at least some embodiments.

FIG. 1 shows an overhead view of a marine survey system 100 in accordance with at least some embodiments. In particular, FIG. 1 shows a survey or tow vessel 102 having onboard equipment 104, such as navigation, seismic energy source control, and data recording equipment and data processing equipment. Data processing equipment within onboard equipment 104 may be used, for example, to process seismic acoustic data, as described further below. Vessel 102A is, configured to tow one or more sensor streamers 106A-F through a water body 113. While FIG. 1 illustratively shows six sensor streamers 106, any number of sensor streamers 106 may be used.

In the example system, the sensor streamers 106 are coupled to towing equipment that maintains the sensor streamers 106 at selected depth and lateral positions with respect to each other and with respect to the survey vessel 102. The towing equipment may comprise two paravane tow lines 108A and 108B each coupled to the vessel 102 by way of winches 110A and 110B, respectively. The winches enable changing the deployed length of each paravane tow line 108. The second end of paravane tow line 108A is coupled to a paravane 112, and the second end of paravane tow line 108B is coupled to paravane 114. In each case, the tow lines 108A and 108B couple to their respective paravanes through respective sets of lines called a "bridle". The paravanes 112 and 114 are each configured to provide a lateral force component to the various elements of the survey system when the paravanes are towed in water body 113. The combined lateral forces of the paravanes 112 and 114 separate the paravanes from each other until the paravanes put one or more spreader lines 120, coupled between the paravanes 112 and 114, into tension. The paravanes 112 and 114 either couple directly to the spreader line 120 or, as illustrated, couple to the spreader line by way, of spur lines 122A and 122B.

As illustrated, the sensor streamers 106 are each coupled, at the ends nearest the vessel 102 (i.e., the proximal ends), to a respective lead-in cable termination 124A-F. The lead-in cable terminations 124 are coupled to or are associated with the spreader lines 120 so as to control the lateral positions of the streamers 106 with respect to each other and with respect to the vessel 102. Electrical and/or optical connections between the appropriate components in the onboard equipment 104 and the sensors (e.g., 116A, 116B) in the streamers 106 may be made using inner lead-in cables 126A-F. Much like the tow lines 108 associated with respective winches 110, each of the lead-in cables 126 may be deployed by a respective winch or similar spooling device such that the deployed length of each lead-in cable 126 can be changed. The illustrated towing equipment may be used alone or in conjunction with other lateral position and depth control equipment. Other example systems may have more complex or simpler towing arrangements.

Each sensor streamer 106 may comprise an elongated outer jacket defining an interior volume. The elongated outer jacket defines a central axis along the long dimension of the sensor streamer. In the example situation of FIG. 1, the central axis of each sensor streamer is parallel to the direction of travel, or the sail line, of the tow vessel 102, indicated by arrow 117. The orientation of sensor streamers 106 in relation to the vessel 102 can change over time (e.g., in response to water currents present in water body 113, turning of the vessel). Sail line 117, and the nominal direction of the central axis of sensor streamers 106 may define an axis of a two-dimensional coordinate system, denoted as the "Y" axis in FIG. 1. The direction of sail line 117 need not align with a principal direction of a fixed coordinate system, such as a North-East coordinate system, but may be directed along a selected azimuth in such a system. The direction may also be referred to as the "inline" direction. An orthogonal axis of the coordinate system denoted "X" in FIG. 1 may be referred to as the cross-line direction. As described further below, the coordinates of the sensors 116 and sources 190A,B may define the spatial portion of a time-space domain of a set of seismic acoustic signals. This spatial domain may be defined in terms of the X-Y coordinates of the sensors and sources, or coordinate transforms thereof, such as midpoint and X/Y offset, midpoint, offset and azimuth and the like.

The sensors (e.g., 116A, 116B) may reside within the interior volume or on the elongated outer jacket, and the sensors may be longitudinally spaced along each sensor streamer 106, e.g., in the inline direction. Each sensor 116 thus may have in inline position $Y_{sen}$. Further each sensor 116 may have a crossline position $X_{sen}$ which is nominally the same for each sensor 116 on a particular streamer 106. In some embodiments, the sensors 116 are geophones which are sensitive to the displacement rate of particles in the immediate proximity of the sensor. The geophones may be suspended in a gimbal arrangement such that each geophone is most sensitive to vertical displacement changes (i.e., aligned with the force of gravity). In other embodiments, the geophones may be three-axis geophones sensitive to displacement changes along three orthogonal axes. In still other embodiments, the sensors 116 are hydrophones which are highly sensitive to pressure changes. In yet still other cases, the sensors 116 may include one or any combination of the following: geophones; hydrophones, accelerometers, solid-state motion sensors, multiple component geophones, orientation sensors, and electromagnetic sensors.

Although it may be possible to have the recording equipment 104 record signals from each sensor 116 individually, in some cases the sensors associated with a sensor streamer are logically divided into groups for purposes of recording received signals, such as sensor groups 180, 182, and 184 associated with sensor streamer 106F. In particular, in some cases a plurality of sensors along a sensor streamer are logically grouped together and operate in parallel (as an array) such that a single received signal (i.e., "channel" or "trace") is created based on the contributions of measurements from each sensor in the group. Sensor streamers 106 may each have any length. In an example system the sensor streamers may be between 5 kilometers (km) and 15 km, and each sensor streamer may comprise some 600 or more sensor groups (a sensor group comprising two or more sensors). In an example sensor streamer having a length of 7.5 km, a single group of sensors may span a longitudinal distance of 12.5 meters (m), and thus a single sensor streamer may have 600 sensor groups.

Still referring to FIG. 1, in some situations the tow vessel 102A, in addition to towing the sensor streamers 106, may also tow one or more seismic acoustic sources 190A. The seismic acoustic source 190A may take any suitable form, such as an air gun-type system. In at least some embodiments of marine survey system 100 a second vessel, survey vessel 102B may tow a second source, seismic acoustic source 190B. Survey vessel 102B may be disposed in a spaced apart relationship with survey vessel 102A in the crossline direction. In this way, the crossline offset or crossline distance, between a source and the sensors, may be increased. The range of crossline offsets obtained in a particular survey may be varied by selecting the crossline separation of survey vessels 102A, 102B. For example, in at least some embodiments the separation may be in the range of about 600 meters to 4 kilometers.

Simultaneously with the towing of the sensor streamers 106, interrogating energy is released from the acoustic sources 190A, 190B (the releasing, and subsequent data collection, being referred to in some cases as a "shot"). In particular, in embodiments of a marine survey system 100 including two survey vessels as in FIG. 1, a technique referred to as simultaneous shooting may be used, wherein acoustic sources 190A, 190B are fired with predetermined time delays between the firing times at distinct spatial locations. (In simultaneous shooting, a small, random difference in the firing time of the two sources, or a relative spatial separation, may be used to facilitate the separation of signals related to the two sources.) Within a time window after the release of interrogating energy from the acoustic sources 190A, 190B, energy incident upon the sensor streamers is recorded. The length of the time window within which data is recorded is based on many factors, such as depth of the target hydrocarbon bearing formation, depth of water body 113, desired record length, and speed of the tow vessel. For an illustrative towing speed of about 5 knots (approximately 2.5 meters per second), the time window may be on the order of about 7.5 seconds for a record length covering about 18.75 meters traveled. Again for an illustrative towing speed of about 5 knots, the time window may be on the order of about 15 seconds for a record length covering about 37.5 meters traveled. Thus, a shot may comprise release of acoustic energy, and then a recording time of about 7.5 seconds to about 15 seconds (depending on the various factors). In most cases, as soon as the time window expires, another release of acoustic energy occurs and the process repeats. Thus, the acquisition of seismic acoustic data comprises sampling in time, and, by virtue of the discrete locations of the sensors, also sampling in space, thereby generating a set of seismic acoustic signals in the time-space domain.

Figure 1A:
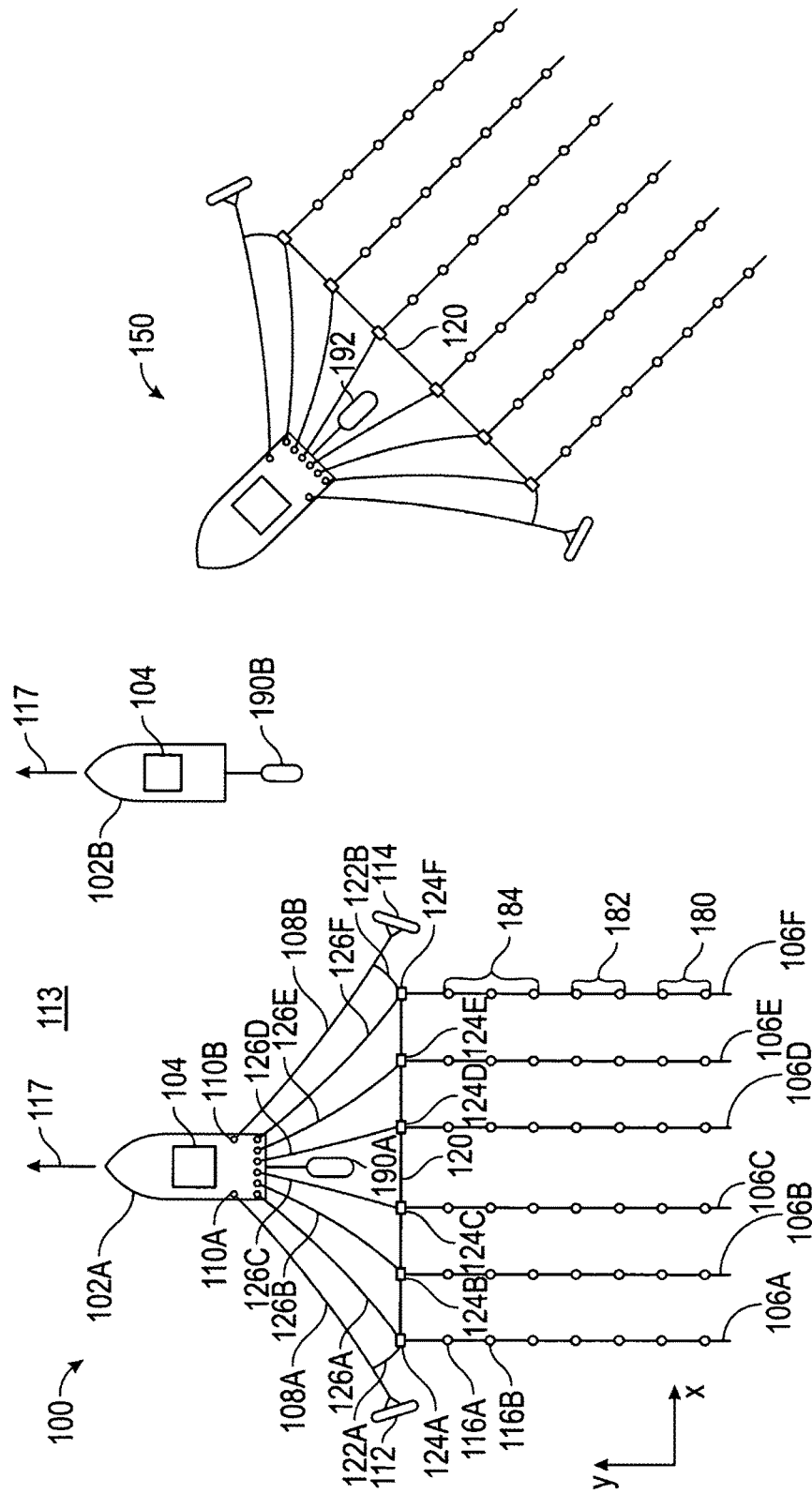
FIG. 1A shows an overhead view of a marine survey system in accordance with at least some embodiments.

As previously described, acoustic energy released into a water body 113 may be scattered by objects in the water body such as another survey vessel 150, FIG. 1A. The scattered acoustic energy may also impinge on sensors 116 and thus contaminate the desired signals. Further survey vessel 150 may be operating independently of survey vessels 102A, 102B and acoustic energy from seismic acoustic source 192 associated with survey vessel 152 may also produce seismic interference noise in sensors 116. Seismic interference noise may be mitigated by suitably processing the seismic acoustic data in accordance with at least some embodiments.

As described in conjunction with FIGS. 1 and 1A, the set of seismic acoustic signals (in the time-space domain) may be generated by acoustic energy impinging on a set of sensors, e.g., sensors 116, disposed within seismic sensor streamers disposed within a water body. The acoustic energy impinging on the sensors may follow the release of interrogating energy from a seismic source into the water body, and the subsequent reflection of the interrogating energy from formations beneath the water body. Further, multiple seismic acoustic sources may be operating in the water body, e.g., seismic acoustic sources 190A, 190B, 192, and may introduce seismic interference noise into the set of reflected seismic acoustic signals. In other words, the set of seismic acoustic signals may comprise a desired reflected interrogating signal and an interfering signal from the seismic interference noise.

Figure 2:
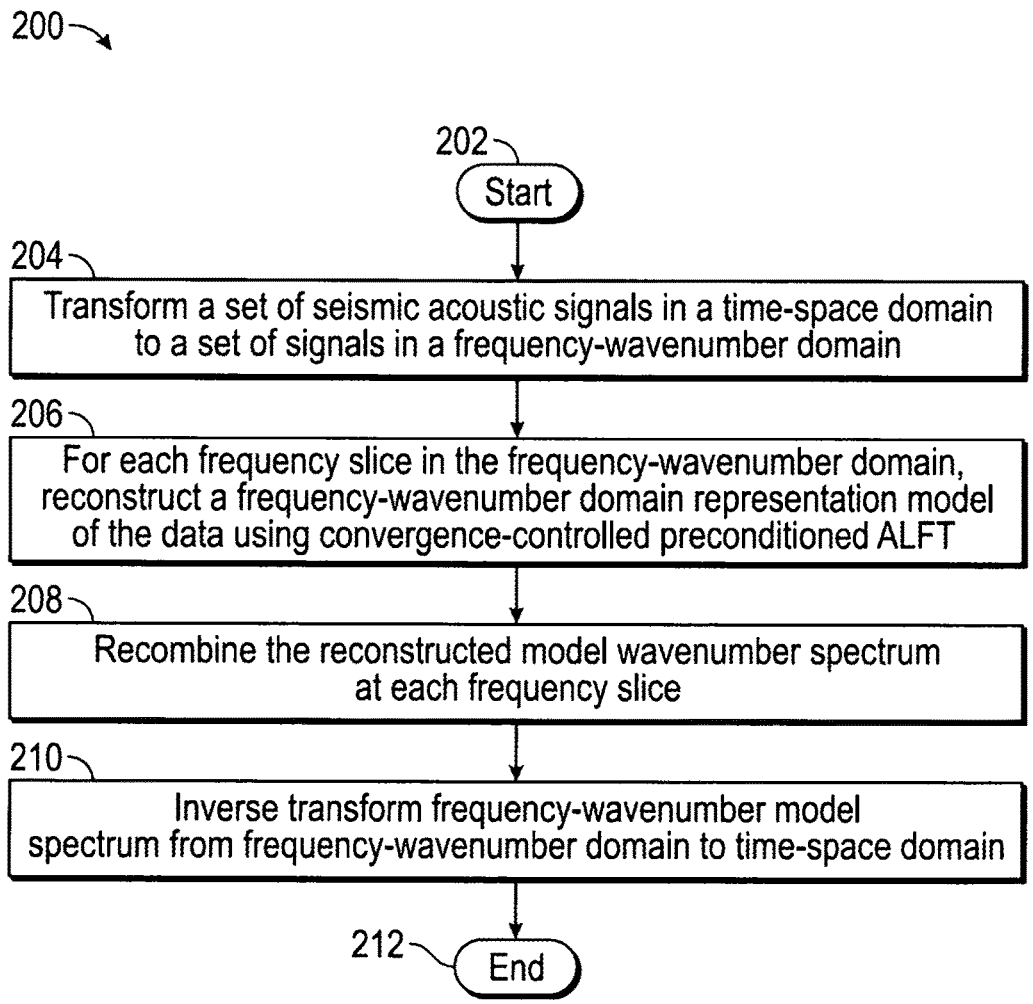
FIG. 2 shows a flow chart of a method in accordance with at least some embodiments.

Turning now to FIG. 2, there is shown a method 200 for processing seismic acoustic data. Method 200 may be performed, at least in part, by a processor in conjunction with program instructions stored in a memory as described in conjunction with FIG. 5, below. Method 200 starts at block 202. In block 204, a set of seismic acoustic signals in a time-space domain is transformed, for example, into a frequency-wavenumber domain. Seismic acoustic signals in the time-space domain may be referred to, for ease of description, as time-space domain seismic acoustic signals. As described above, the set of time-space domain seismic acoustic signals may be provided by one or more sensors, e.g., sensors 116, FIG. 1, in response to the release of interrogating energy from one or more seismic acoustic sources, e.g., seismic acoustic sources 190A, 190B. In one example, the time-space domain seismic acoustic signals may be transformed, by a first transformation comprising a discrete Fourier transform (DFT) of the set of samples-in-time into a frequency-space domain, and a second transform comprising a single or multi-dimensional spatial DFT of the seismic acoustic data in the frequency-space domain into the frequency-wavenumber domain. The transform may be performed, in at least some embodiments by a processor, and, in particular, by a processor within data processing equipment onboard a survey vessel 102A, as described further below.

The spatial DFT may be described as a decomposition of the acoustic signal into constituent sinusoidal and cosinusoidal waves, each identified by a value of the spatial wavenumber ($\vec{k}$). As discovered by the present inventors, by iteratively removing the wavelength components having the largest magnitude, the desired signal to seismic interference noise signal ratio may be increased. In other words, the value of seismic interference noise, for example, in a resulting set of seismic acoustic signals upon termination of the iteration, may be less than the value of seismic noise in the set of seismic acoustic signals prior to the iteration.

The spatial portion of the time-space domain may be based on the X and Y coordinates of the sensors and sources, or on coordinate transformations thereof. The principles reflected in the exemplary embodiments are not dependent on the selection of a particular coordinate system. Further as the spatial portion of the time-space domain may be multi-dimensional, the wavenumber portion of the frequency-wavenumber domain may be likewise multidimensional. Stated otherwise, a wavenumber spectrum may comprise vector wavenumbers. While, for simplicity, the description of operations with respect to wavenumber components may suggest that the wavenumbers are scalar quantities, it would be understood that the respective operations may be over a vector space of wavenumbers.

Further, the set of seismic acoustic signals may correspond to a plurality of releases of interrogating energy by the acoustic source. Furthermore, the signals may be selected based on grouping criteria not related to the release of energy by an individual acoustic source. Examples of alternative group-types include common midpoint gathers, common offset gathers and common azimuth gathers.

Continuing with FIG. 2, at block 206, for each frequency "slice" in the frequency-wavenumber domain, a frequency-wavenumber domain representation model wavenumber spectrum of the seismic acoustic signals is reconstructed. For example, such a model wavenumber spectrum may be reconstructed using a convergence controlled, preconditioned anti-leakage Fourier transform (ALFT) as described in further detail in conjunction with FIGS. 3A and 3B. As described further below, the reconstructed frequency-wavenumber domain model wavenumber spectrum at each frequency slice are recombined at block 208. In block 210, the recombined, frequency-wavenumber model spectrum is inverse transformed from the frequency-wavenumber domain back into the time-space domain. For example, the inverse transformation may comprise a first inverse DFT in the frequency domain and a second inverse DFT in the wavenumber domain.

In accordance with at least some embodiments of the disclosure, a geophysical data product may be produced including the inverse-transformed frequency-wavenumber model spectrum. The geophysical data product may be stored on a non-transitory, tangible computer-readable medium. The geophysical data product may be produced offshore, for example by a computer system as described further below in conjunction with FIG. 5, which may be included in onboard equipment on a vessel, or onshore (i.e., at a facility on land) either within the United States or in another country. If the geophysical data product is produced offshore or in another country, it may be imported onshore to a facility in the United States. Once onshore in the United States, geophysical analysis, including further data processing, may be performed on the geophysical data product.

Figure 3A:
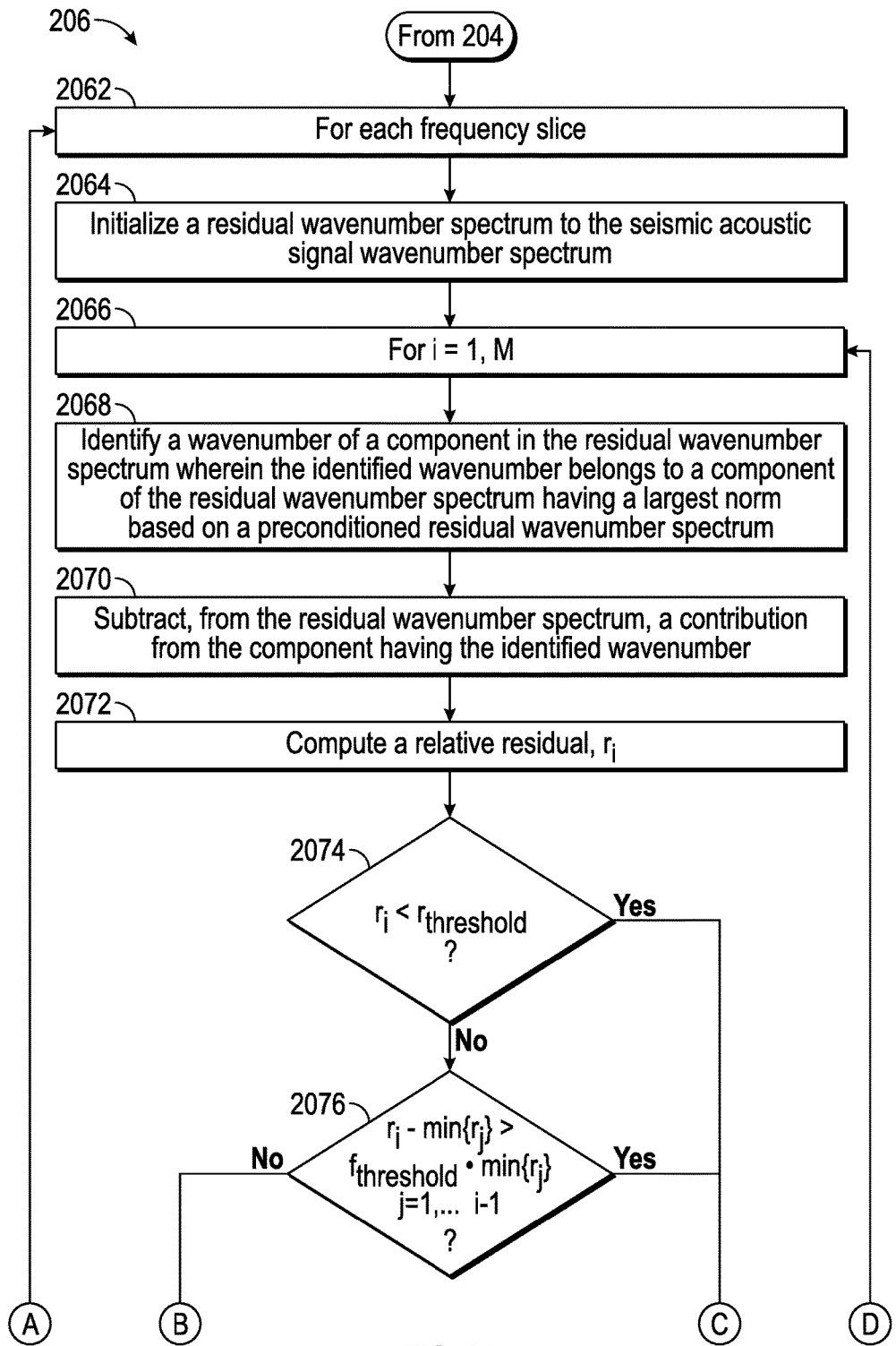
FIGS. 3A, and 3B shows a portion of the flow chart of FIG. 2 in further detail in accordance with at least some embodiments.
Figure 3B:
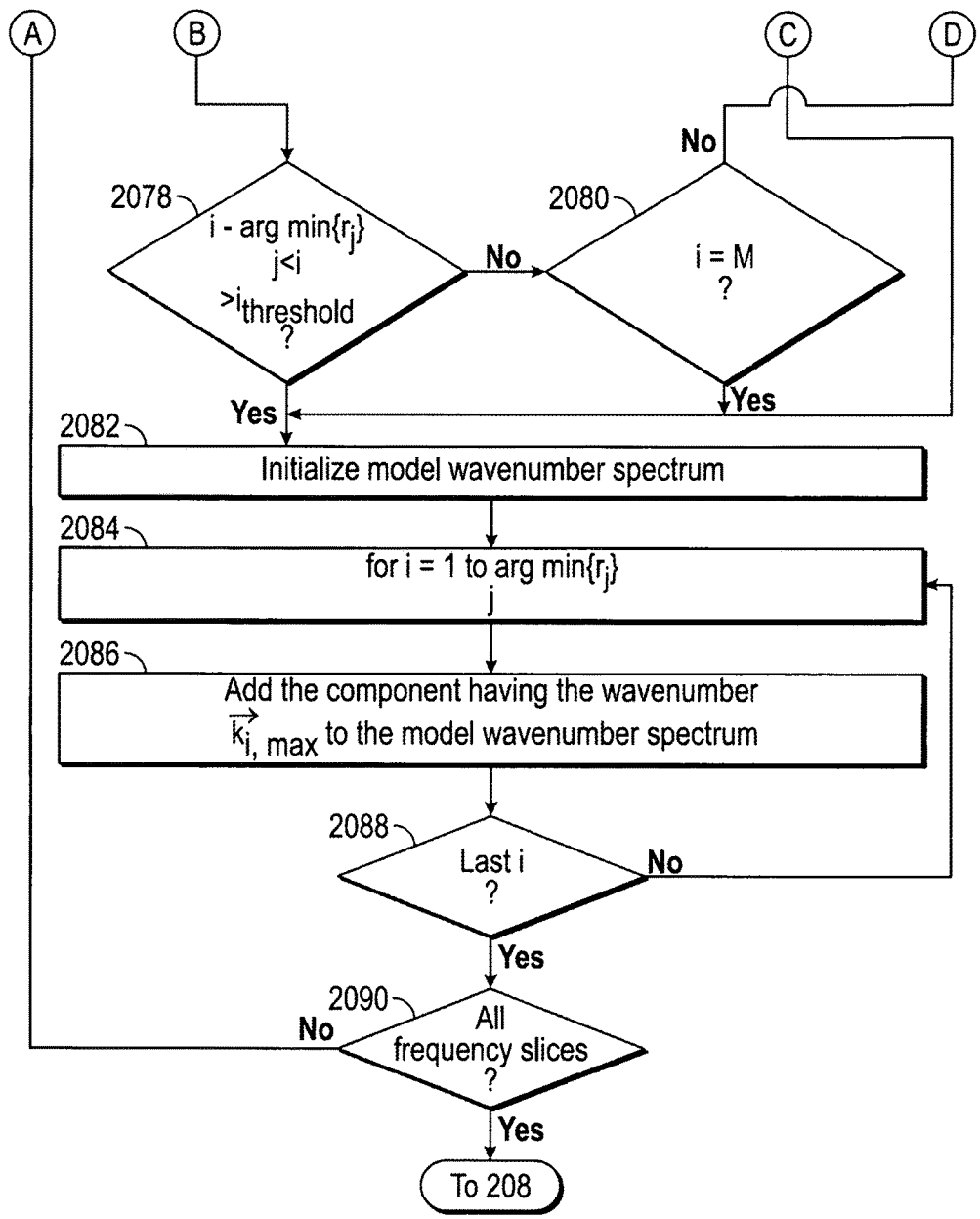

Turning to FIGS. 3A and 3B, block 206 is shown in further detail. In block 2062, a loop over frequencies comprising the frequency domain portion of the frequency-wavenumber domain is entered. In other words, for each frequency slice in the frequency-wavenumber domain, a model wavenumber spectrum may be reconstructed. In block 2064, an initial residual wavenumber spectrum $R_0(\vec{k})$ is initialized to the input data seismic acoustic signal wavenumber spectrum, denoted here by $D(\vec{k})$, for the frequency that is being processed. In other words, the initial residual wavenumber spectrum may be based on the set of wavenumber domain seismic acoustic signals at each frequency slice in the frequency domain. As described above, the seismic acoustic wavenumber spectrum may be obtained by a spatial DFT applied to frequency-space domain seismic acoustic signals. An iteration loop is entered at block 2066. The loop exits based on termination criteria described further below. As described above, the wavenumber domain, in at least some embodiments, may be multidimensional; wavenumbers therein comprising vector wavenumbers.

In block 2068, a wavenumber, $\vec{k}_{i,max}$, of a component in a residual wavenumber spectrum is identified wherein the identified wavenumber $\vec{k}_{i,max}$ belongs to the component in the residual wavenumber spectrum having a largest norm based on a preconditioned residual wavenumber spectrum. For example, the largest norm based on the preconditioned residual wavenumber spectrum may comprise a maximum norm of the preconditioned residual wavenumber spectrum, in which $\vec{k}_{i,max}$ corresponds to the vector wavenumber satisfying: $\max_{\vec{k}}\{\text{norm}\{R_{i-1}(\vec{k}) \cdot w(\vec{k})\}\}$ where $w(\vec{k})$ is a suitable preconditioning function. The index, i, denotes the $i^{th}$ iteration in the loop entered at block 2066. Any suitable norm may be used. For example, in at least some embodiments, an L2 norm may be used. An L2 norm may also be referred to as a Euclidean norm and, at least in embodiments in which the component of the preconditioned residual wavenumber spectrum is represented in an orthogonal basis, e.g., sin and cos, the Euclidean norm comprises the magnitude of the preconditioned wavenumber spectrum component. Turning to the preconditioning function, $w(\vec{k})$, by way of example, in at least some embodiments, the preconditioning function may be the so-called "boxcar" function taking the value 1 for wavenumbers which lie inside of a "signal cone" in the wavenumber domain and taking the value 0 for wavenumbers lying outside the signal cone. The signal cone represents a region in the wavenumber domain in which the acoustic wave equation describing the propagation of the seismic acoustic signals in the water body has solutions for real-valued wavenumbers. Outside of the signal cone, solutions of the acoustic wave equation exist for complex-valued wavenumbers. The values of, $\vec{k}_{i,max}$ may be stored for subsequent use in a memory of a computer system, such as a main memory 512, FIG. 5, described further below, or written to a file and stored in a non-transitory storage device, such as computer-readable storage device 590, FIG. 5.

In block 2070, a contribution to the residual wavenumber spectrum from the component having the identified wavenumber is subtracted from the residual wavenumber spectrum, $R_{i-1}(\vec{k})$. For example, the residual spectrum at the $i^{th}$ iteration may be determined by $R_i(\vec{k})=R_{i-1}(\vec{k})-P(\vec{k}-\vec{k}_{i,max}) \cdot R_{i,max}(\vec{k}_{i,max})$, where $P(\vec{k}-\vec{k}_{i,max})$ represents a preselected point spread function that distributes a fraction of the leakage pattern corresponding to the identified wavenumber to wavenumbers about $\vec{k}_{i,max}$. The component in the residual wavenumber spectrum corresponding to the identified wavenumber is denoted $R_{i,max}$. In at least some embodiments, the point spread function P may be the "delta" distribution having the value 1 at $\vec{k}=\vec{k}_{i,max}$ and the value 0 elsewhere. Similarly to the wavenumber, the values of $R_{i,max}$ may be stored for subsequent use in the memory of a computer system, such as a main memory 512, FIG. 5, or written to a file and stored in a non-transitory storage device, such as computer-readable storage device 590, FIG. 5.

In block 2072, a relative residual at the $i^{th}$ iteration is computed. In at least some embodiments, the relative residual may be based on a norm of the residual spectrum components summed over the wavenumbers contributing to the wavenumber domain. Further, the relative residual may be determined relative the norm of the components of the initial wavenumber domain seismic acoustic signals summed over the wavenumbers comprising the wavenumber domain. Stated otherwise, denoting the relative residual at the $i^{th}$ iteration by $r_i$, then, in at least some embodiments, $r_i = \Sigma_{\vec{k}}\text{norm}\{R_i(\vec{k})\}\Sigma_{\vec{k}}\text{norm}\{D_i(\vec{k})\}$.

Termination conditions with respect to the loop entered at block 2066 are evaluated in blocks 2074-2080. The first termination condition to occur terminates the loop and the process breaks out of the loop, as will now be described. In block 2074, it is determined if the relative residual at the $i^{th}$ iteration is less than a preselected absolute minimum relative residual. In other words, denoting the minimum absolute relative residual by $r_{threshold}$, the termination condition may be written $r_i < r_{threshold}$. If the termination condition is satisfied, block 2074 proceeds by the "Yes" branch to block 2082, breaking out of the loop entered at block 2066. Otherwise, block 2074 proceeds by the "No" branch to block 2076. In block 2076, iterations terminate if the current relative residual, i.e., the relative residual at the $i^{th}$ iteration exceeds the minimum residual so far encountered by more than a preselected threshold factor $f_{threshold}$. Stated otherwise, if $r_i - \min\{r_j\}_{j<i} > f_{threshold} \cdot \min_{j<i}\{r_j\}$, for some $j=1, 2, \ldots, i-1$, then the loop entered at block 2066 exits and block 2076 proceeds by the "Yes" branch to block 2082. Otherwise, block 2076 proceeds by the "No" branch to block 2078. In block 2078, the iterations terminate at the $i^{th}$ iteration if the minimum residual has not been updated for the last $i_{threshold}$ number of iterations. In other words, if the termination condition i-arg $\min\{r_j\}_{j<i} > i_{threshold}$, for $j=1, 2, \ldots, i-1$, is satisfied, then block 2078 proceeds by the "Yes" branch to block 2082, breaking out of the loop entered at block 2066. In the aforesaid termination condition arg $\min\{r_j\}_{j<i}$ denotes the iteration index corresponding to the minimum relative residual computed. If the termination condition in block 2078 is not satisfied, block 2078 proceeds by the "No" branch to block 2080, and if a preselected maximum number of iterations, M, has not been reached, block 2080 proceeds by the "No" branch and returns to block 2066 to continue with the next iteration. In other words, the identifying, subtracting and computing, at blocks 2068, 2070 and 2072, respectively are repeated until a first occurrence of a termination condition at blocks 2074, 2076, 2078, or 2080. Otherwise, block 2080 falls through the "Yes" branch to block 2082, terminating the loop.

In blocks 2082-2088, a model wavenumber spectrum is reconstructed as if iterations had stopped at the iteration where a minimum in absolute value of the relative residual was reached. In other words, the reconstruction of the model wavenumber spectrum may include only those residual wavenumber spectrum components up to the component that $R_{m,max}$, where the index m corresponds to the iteration where the minimum absolute value of the relative residual, $r_i$ occurs. In block 2082, a model wavenumber spectrum is initialized. The model wavenumber spectrum may be initialized to be zero in at least some embodiments. In block 2084 an iteration loop is entered which runs over the iterations from the first iteration (i=1) to the iteration index corresponding to the minimum relative residual, arg $\min\{r_j\}$. In the notation above, m=arg $\min\{r_j\}_j$. At each iteration, the component having the wavenumber $\vec{k}_{i,max}$ as identified in block 2068, for example, is added to the model wavenumber spectrum, block 2086. In the notation set forth above, the component added at the $i^{th}$ iteration in the loop entered in block 2084 is $R_{i,max}(\vec{k}_{i,max})$. The values of $\vec{k}_{i,max}$ and $R_{i,max}(\vec{k}_{i,max})$ may, in at least some embodiments, be retrieved from a main memory or a non-transitory storage device of a computer system where they were previously stored. At block 2088 it is determined if the last iteration through the loop 2084-2088 has occurred, and, if not, block 2088 falls through the "No" branch to return to block 2084. Otherwise, block 2088 falls through the "Yes" branch to block 2090 where, if the model wavenumber spectrum has been reconstructed for all frequency slices in the frequency domain, block 2090 proceeds through the "Yes" branch to return to block 208. Otherwise, block 2090 proceeds through the "No" branch to return to block 2062 to reconstruct the model wavenumber spectrum for the next frequency slice. In other words, the model wavenumber spectrum may be reconstructed on a frequency slice by frequency slice basis via blocks 2064-2088. Stated differently, for each frequency slice in the frequency domain, a reconstructed model wavenumber spectrum may comprise, in set-theoretic terms, a union of each of the residual spectrum wavenumber components in the wavenumber domain having, at each iteration of the loop at block 2066, the wavenumber identified as described above in conjunction with block 2068. The union may be over such components up to the iteration at which the minimum absolute relative residual occurs, as previously described. When the model wavenumber spectrum has been reconstructed for all frequency slices, block 2090 proceeds via the "Yes" branch to block 208, FIG. 2.

In block 208, the reconstructed model wavenumber spectra at each frequency slice are recombined, the recombined reconstructed model wavenumber spectrum forming a frequency-wavenumber model spectrum. Stated otherwise, a reconstructed model frequency-wavenumber spectrum may comprise, in set-theoretic terms, a union, over all frequency slices, of the reconstructed model wavenumber spectrum at each frequency slice in the frequency domain, as described above.

In block 210, the reconstructed frequency-wavenumber model spectrum is inverse transformed back to the time-space domain from the frequency-wavenumber domain, as previously described, and method 200 ends at block 212. The inverse-transformed frequency-wavenumber model spectrum may then provide a set of resulting seismic acoustic signals with diminished seismic interference noise. The resulting seismic acoustic signals may be included in a geophysical data product as previously described and/or displayed on a display device as described further below in conjunction with FIGS. 4b and 5.

Figure 4A:
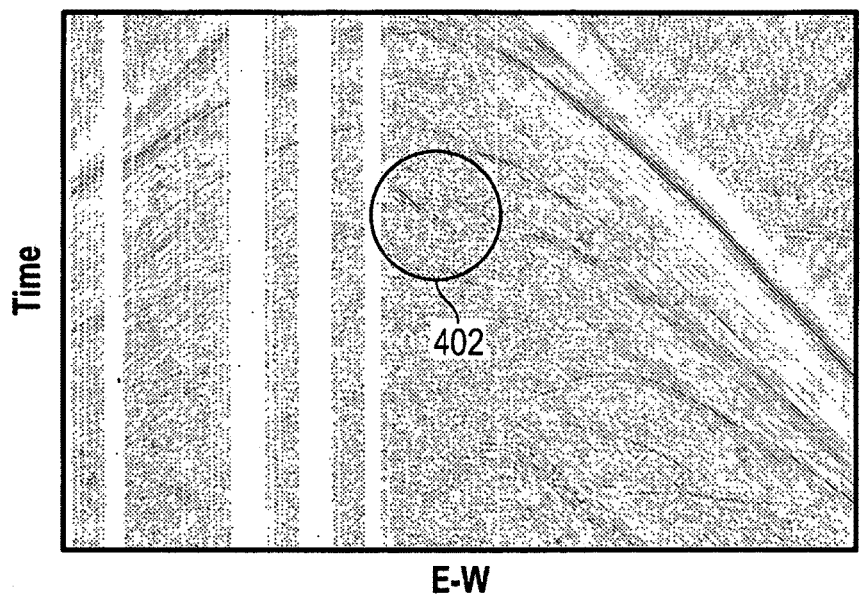
FIGS. 4A and 4B show a plot of seismic acoustic signals in accordance with at least some embodiments.
Figure 4B:
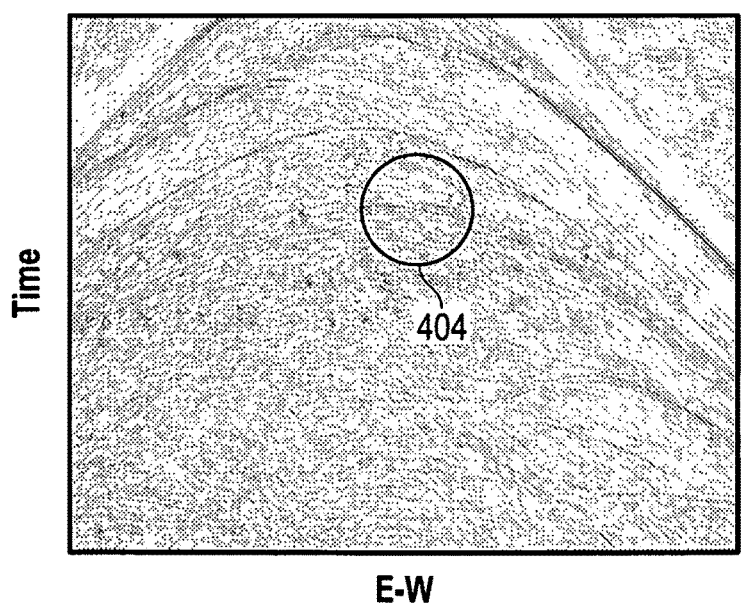

To further appreciate the foregoing, FIGS. 4A and 4B, show an example of seismic trace field data in the time-space domain. FIG. 4A shows an exemplary screenshots of a seismic trace field data comprising reflected seismic acoustic energy from a formation beneath a water body. The seismic trace field data represents a slice through a four-dimensional "cube" of data. The horizontal axis may be along an East-West direction, for example, and the vertical axis corresponds to time. The set of seismic acoustic signals represented in FIG. 4A were processed in accordance with related art techniques, exhibiting the effects of seismic interference noise in the region circumscribed by circle 402. By contrast, FIG. 4B, shows an exemplary screenshot of a slice through a reconstructed four-dimensional "cube" of data seismic trace field data processed in accordance with an embodiment of the disclosure. For example, the seismic field data shown in FIG. 4B may correspond to the seismic signals as described in conjunction with block 210, FIG. 2. As shown by the region within circle 404, seismic interference noise is substantially reduced.

Figure 5:
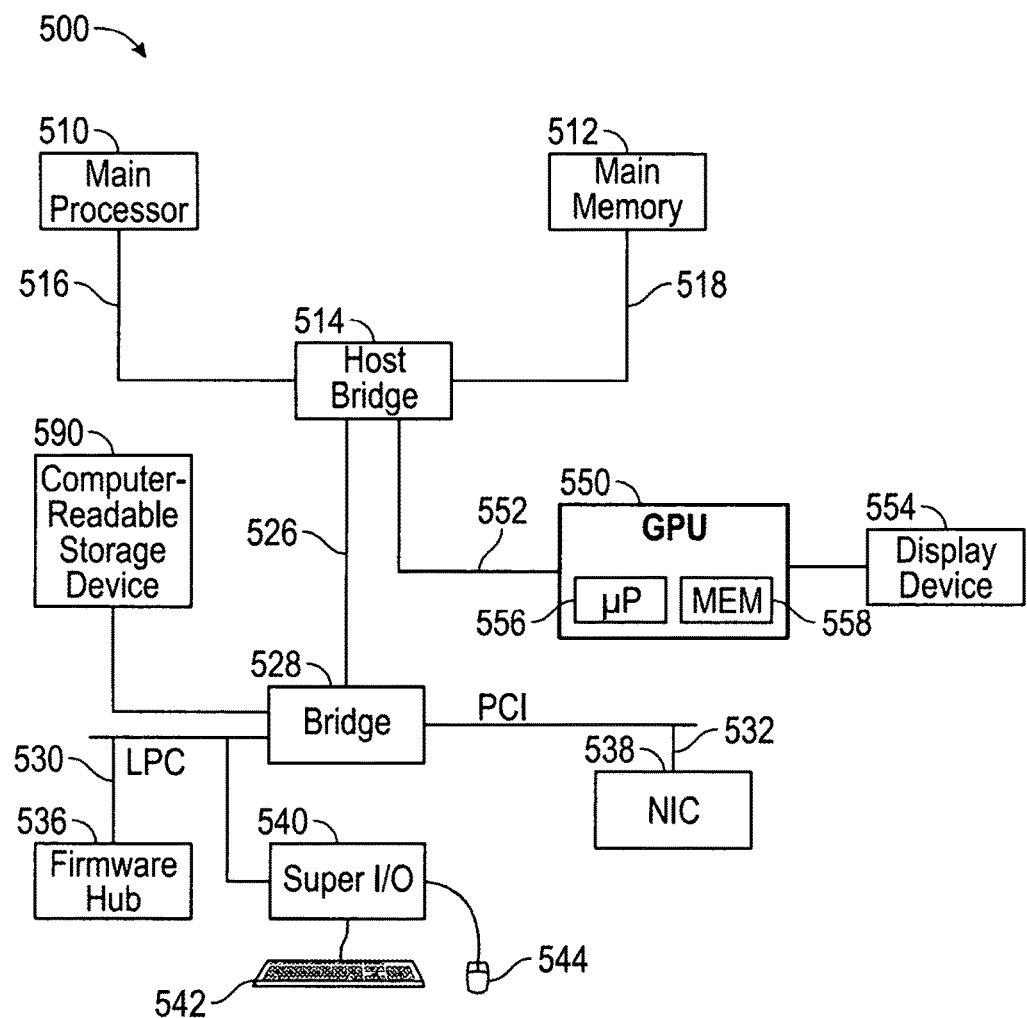
FIG. 5 shows a block diagram of a computer system in accordance with at least some embodiments.

FIG. 5 illustrates a computer system 500 as one example of any number of computing devices that may be used to implement at least some embodiments. Any or all of the embodiments that involve calculating transforms of seismic acoustic signals, identifying components within the transformed seismic acoustic signals, subtracting the identified components, and the like, may be implemented, in whole or in part, on a computer system such as that shown in FIG. 5, or after-developed computer systems. A computer system such as computer system 500, or multiple computer systems such as computer system 500, may be part of the onboard equipment 104, and may be configured to receive the space-time domain seismic acoustic signals from one or more sensors, e.g., sensors 116, deployed within a water body, as described above in conjunction with, inter alia, FIGS. 1 and 1A.

Computer system 500 comprises a processor 510 coupled to a main memory array 512, and various other peripheral computer system components, through integrated host bridge 514. The processor 510 may be a single processor core device, or a processor implementing multiple processor cores. Furthermore, computer system 500 may implement multiple processors 510. The processor 510 couples to the host bridge 514 by way of a host bus 516, or the host bridge 514 may be integrated into the processor 510. Thus, the computer system 500 may implement other bus configurations or bus-bridges in addition to, or in place of, those shown in FIG. 5.

The main memory 512 couples to the host bridge 514 through a memory bus 518. Thus, the host bridge 514 comprises a memory control unit that controls transactions to the main memory 512 by asserting control signals for memory accesses. In other embodiments, the processor 510 directly implements a memory control unit, and the main memory 512 may couple directly to the processor 510. The main memory 512 functions as the working memory for the processor 510 and comprises a memory device or array of memory devices in which programs, instructions and data are stored. For example, main memory 512 may store values of $k_{i,max}$ and $R_{i,max}(\vec{k}_{i,max})$ as previously described. The main memory 512 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM). The main memory 512 may store instructions for performing operations such as those described above in conjunction with FIG. 2 when executed by processor 510, for example. Other storage media include examples of non-transitory computer readable storage media such as disk drives and flash memory devices (e.g., computer-readable storage device 590), which may also store programming instructions for performing operations as described above. Computer-readable storage device 590 may also store data files comprising, for example values of $\vec{k}_{i,max}$ and $R_{i,max}(\vec{k}_{i,max})$ as described above. Computer-readable storage device 590 may also store a geophysical data product, such as the geophysical data product comprising the seismic-acoustic signals provided by the inverse-transformed frequency-wavenumber model spectrum as described above in conjunction with block 210, FIG. 2.

The illustrative computer system 500 also comprises a second bridge, bridge 528, that bridges the primary expansion bus 526 to various secondary expansion buses, such as a low pin count (LPC) bus 530 and peripheral components interconnect (PCI) bus 532. Various other secondary expansion buses may be supported by the bridge 528. Bridge 528 may also couple computer readable storage device 590 to processor 510 via host bridge 514.

Firmware hub 536 couples to the bridge 528 by way of the LPC bus 530. The firmware hub 536 comprises read-only memory (ROM) which contains software programs executable by the processor 510. The software programs comprise programs executed during and just after power on self-test (POST) procedures as well as memory reference code. The POST procedures and memory reference code perform various functions within the computer system before control of the computer system is turned over to the operating system. The computer system 500 further comprises a network interface card (NIC) 538 illustratively coupled to the PCI bus 532. The NIC 538 acts to couple the computer system 500 to a communication network, such as the Internet, or local- or wide-area networks.

Still referring to FIG. 5, computer system 500 may further comprise a super input/output (I/O) controller 540 coupled to the bridge 528 by way of the LPC bus 530. The Super I/O controller 540 controls many computer system functions, for example interfacing with various input and output devices such as a keyboard 542, a pointing device 544 (e.g., mouse) various serial ports, floppy drives and disk drives. The super I/O controller 540 is often referred to as "super" because of the many I/O functions it performs.

The computer system 500 may further comprise a graphics processing unit (GPU) 550 coupled to the host bridge 514 by way of bus 552, such as a PCI Express (PCI-E) bus or Advanced Graphics Processing (AGP) bus. Other bus systems, including after-developed bus systems, may be equivalently used. Moreover, the graphics processing unit 550 may alternatively couple to the primary expansion bus 526, or one of the secondary expansion buses (e.g., PCI bus 532). The graphics processing unit 550 couples to a display device 554 which may comprise any suitable electronic display device upon which any image or text can be plotted and/or displayed, for example, the time-space domain signals from the inverse-transforms at block 210, FIG. 2. The plot of seismic traces discussed with respect to FIG. 4B is illustrative of such signals. The graphics processing unit 550 may comprise an onboard processor 556, as well as onboard memory 558. The processor 556 may thus perform graphics processing, as commanded by the processor 510. Moreover, the memory 558 may be significant, on the order of several hundred megabytes or more. Thus, once commanded by the processor 510, the graphics processing unit 550 may perform significant calculations regarding graphics to be displayed on the display device, and ultimately display such graphics, without further input or assistance of the processor 510.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, reconstructions of various dimensionality, e.g., 5D (i.e., time and four spatial coordinates), 4D, 3D, may be generated in accordance with the principles reflected in the disclosed embodiments. It is intended that the following claims be interpreted to embrace all such variations and modifications.

What is claimed is:

1. A computer-implemented method of reducing seismic noise in a wavenumber spectrum, the method comprising:
   identifying, by a computer system, a wavenumber of a component in a residual wavenumber spectrum, wherein the identified wavenumber belongs to the component of the residual wavenumber spectrum having a largest norm based on a preconditioned residual wavenumber spectrum;
   subtracting, from the residual wavenumber spectrum, a contribution to the residual wavenumber spectrum from the component having the identified wavenumber, wherein a next residual wavenumber spectrum is based on the subtracting;
   computing, by the computer system, a relative residual based on the next residual wavenumber spectrum;
   repeating, by the computer system, using the next residual wavenumber spectrum, the identifying, subtracting and computing until at least one termination condition is met from the group consisting of a difference between the current relative residual and a smallest relative residual is more than a product of the smallest relative residual and a preselected threshold factor, and a difference between a current number of iterations of the repeating and a number of iterations corresponding to the smallest relative residual computed is more than a preselected threshold number of iterations; and
   adding, for each iteration, the contribution to the residual wavenumber spectrum having the identified wavenumber to a model wavenumber spectrum, and thereby creating modified data;
   wherein the modified data has less seismic noise than the residual wavenumber spectrum prior to subtracting.

2. The method of claim 1 further comprising transforming a set of time-space domain seismic acoustic signals to a set of frequency-wavenumber domain seismic acoustic signals, wherein an initial residual wavenumber spectrum comprises a wavenumber spectrum of the set of frequency-wavenumber domain seismic acoustic signals.

3. The method of claim 2 further comprising:
   releasing interrogating energy from a first seismic source into a water body, and wherein the set of time-space domain seismic acoustic signals comprises a set of signals generated by a set of sensors disposed within the water body responsive to the releasing.

4. The method of claim 3 wherein:
   the set of time-space domain seismic acoustic signals comprises a reflected interrogating signal and an interfering signal; and
   the interfering signal is reduced in a resulting set of seismic acoustic signals on terminating the repeating.

5. The method of claim 4 wherein the reflected interrogating signal is generated based on a first seismic acoustic source and the interfering signal is generated based on a second seismic acoustic source different than the first seismic acoustic source.

6. The method of claim 1 wherein:
   the norm comprises an L2 norm.

7. The method of claim 2 wherein:
   the transforming comprises:
      transforming, by a first transform, to a frequency-space domain; and
      further transforming, by a second transform, to a frequency-wavenumber domain.

8. The method of claim 1 wherein the contribution to the residual wavenumber spectrum from the component having the identified wavenumber comprises a product of a preselected point spread function and the component having the identified wavenumber.

9. The method of claim 1 wherein the adding further comprises adding up to an iteration at which a minimum in absolute value of the relative residual occurs.

10. The method of claim 1 wherein, at each iteration, the relative residual is based on a sum, over a set of wavenumbers contributing to a wavenumber domain, of a norm of the residual wavenumber spectrum.

11. The method of claim 1 wherein the group further consists of a preselected maximum number of iterations.

12. A system for reducing seismic noise in seismic acoustic data, the system comprising:
a computer system configured to receive a first set of time-space domain seismic acoustic signals from sensors deployed within a water body, the computer system comprising:
a processor; and
a memory coupled to the processor, the memory storing a program that when executed by the processor causes the processor to:
transform the first set of time-space domain seismic acoustic signals into a first set of frequency-wavenumber domain seismic acoustic signals;
identify a wavenumber component in a residual wavenumber spectrum, the identified wavenumber belongs to the component of the residual wavenumber spectrum having a largest norm based on a preconditioned residual wavenumber spectrum, and the residual wavenumber spectrum is based on the first set of frequency-wavenumber domain seismic acoustic signals;
subtract from the residual wavenumber spectrum a contribution to the residual wavenumber spectrum from the component having the identified wavenumber, wherein a next residual wavenumber spectrum is based on the subtracting;
compute a relative residual based on the next residual wavenumber spectrum;
repeat using the next residual wavenumber spectrum, the identifying, subtracting and computing until a termination condition is met, the termination condition selected from the group consisting of a difference between the current relative residual and a smallest relative residual is more than a product of the smallest relative residual and a preselected threshold factor, and a difference between a current number of iterations of the repeating and a number of iterations corresponding to the smallest relative residual computed is more than a preselected threshold number of iterations;
add, for each iteration, the component in the residual wavenumber spectrum to a model wavenumber spectrum, the additional creates modified data;
wherein the modified data has less seismic noise than the first set of frequency-wavenumber domain seismic acoustic signals.

13. The system of claim 12 wherein the transform from the time-space domain to the frequency-wavenumber domain comprises:
a first Fourier transform from the time-space domain to a frequency-space domain; and
a second Fourier transform from the frequency-space domain to a frequency-wavenumber domain.

14. The system of claim 12 wherein when the program causes the processor to calculate the relative residual, the program further causes the processor to:
sum a norm of the of the residual wavenumber spectrum over a set of wavenumbers contributing to the wavenumber domain of the frequency-wavenumber domain; and divide the sum by a norm of the first set of frequency-wavenumber domain seismic acoustic signals summed over the set of wavenumbers contributing to the wavenumber domain of the frequency-wavenumber domain.

15. The system of claim 12 wherein when the program causes the processor to subtract the contribution to the residual wavenumber spectrum, the program causes the processor to subtract a product of a preselected point spread function and the component having the identified wavenumber.

16. The system of claim 12 wherein the group further consists of a preselected maximum number of iterations.

17. The system of claim 12 wherein when the software adds, the software further causes the processor to add up to an iteration at which a minimum in absolute value of the relative residual occurs.

18. The system of claim 17 wherein the software further causes the processor to:
recombine, at each frequency slice in the frequency-wavenumber domain, the reconstructed model wavenumber spectrum, the recombining forming a frequency-wavenumber domain model spectrum; and
apply an inverse transform to the frequency-wavenumber domain model spectrum, the inverse transform generating a second set of time-space domain seismic acoustic signals.

19. The system of claim 18 wherein the computer system further comprises a display device configured to display the second set of time-space domain seismic acoustic signals.

20. The system of claim 18 wherein the inverse transform comprises:
a first inverse-Fourier transform from the frequency-wavenumber domain to a frequency-space domain; and
a second inverse-Fourier transform from the frequency-space domain to the time-space domain.

21. The system of claim 12 further comprising one or more sensors coupled to the computer system, wherein the one or more sensors are configured to output the first set of seismic acoustic signals.

22. A computer-implemented method of reducing seismic noise, comprising:
Identifying, by a computer system, a wavenumber of a component in a residual wavenumber spectrum, wherein the identified wavenumber belongs to the component of the residual wavenumber spectrum having a largest norm based on a preconditioned residual wavenumber spectrum;
subtracting, from the residual wavenumber spectrum, a contribution to the residual wavenumber spectrum from the component having the identified wavenumber, wherein a next residual wavenumber spectrum is based on the subtracting;
computing, by the computer system, a relative residual based on the next residual wavenumber spectrum;
repeating, by the computer system, using the next residual wavenumber spectrum, the identifying, subtracting and computing until a current relative residual is less than a threshold residual;
wherein the improvement comprises:
repeating, by the computer system, until at least one termination condition is met, the termination condition being at least one selected from the group consisting of—a difference between the current relative residual and a smallest relative residual is more than a product of the smallest relative residual and a preselected threshold factor, and a difference between a current number of iterations of the repeating and a number of iterations corresponding to the smallest relative residual computed is more than a preselected threshold number of iterations; and adding, for each iteration, the contribution to the residual wavenumber spectrum having the identified wavenumber to a model wavenumber spectrum, and thereby creating modified data;

wherein the modified data has less seismic noise than the residual wavenumber spectrum prior to subtracting.

23. The method of claim 22 further comprising transforming a set of time-space domain seismic acoustic signals to a set of frequency-wavenumber domain seismic acoustic signals, wherein an initial residual wavenumber spectrum comprises a wavenumber spectrum of the set of frequency-wavenumber domain seismic acoustic signals.

24. The method of claim 22 wherein the contribution to the residual wavenumber spectrum from the component having the identified wavenumber comprises a product of a preselected point spread function and the component having the identified wavenumber.

25. The method of claim 22 further comprising wherein the adding further comprises adding up to an iteration at which a minimum in absolute value of the relative residual occurs.

* * * * *